United States Patent [19]

Kasner et al.

[11] Patent Number: 4,574,180

[45] Date of Patent: Mar. 4, 1986

[54] BEAM ALIGNMENT SYSTEM FOR LASER WELDING SYSTEM

[75] Inventors: William H. Kasner, Penn Hills; Richard A. Miller, N. Huntingdon; Vincent A. Toth, Penn Township, Westmoreland County, all of Pa.

[73] Assignee: Westinghouse Electric Corp., Pittsburgh, Pa.

[21] Appl. No.: 622,296

[22] Filed: Jun. 19, 1984

[51] Int. Cl.$^4$ .............................................. B23K 26/02
[52] U.S. Cl. ....................... 219/121 LY; 219/121 LT; 219/121 LU; 219/121 LC
[58] Field of Search .................. 219/121 LT, 121 LP, 219/121 LQ, 121 LR, 121 LS, 121 LU, 121 LV, 121 LY, 121 LZ, 121 LC

[56] References Cited

U.S. PATENT DOCUMENTS 4,125,755 11/1978 Plamquist ................. 219/121 LQ X
4,429,211 1/1984 Carstens et al. ............... 219/121 LC

FOREIGN PATENT DOCUMENTS

0109589 8/1980 Japan ........................... 219/121 LV

Primary Examiner—Clifford C. Shaw
Attorney, Agent, or Firm—D. E. Erickson

[57] ABSTRACT

Apparatus is disclosed for aligning a laser beam used to perform laser machining operations. The aligning apparatus of this invention is used with laser machining apparatus comprising a laser for emitting a laser beam along a path and a laser lens assembly disposed within the path and movable along an axis for variably focusing the laser beam at a plurality of different focal spots corresponding to the plurality of laser machining operations. The alignment apparatus takes the form of an adjustable mirror, which is disposed to intercept the laser beam and to align at least a portion of the path with the axis of the laser lens assembly, whereby the lateral displacement of each of said plurality of focal spots from the axis is reduced as the laser focusing assembly is moved along its axis.

17 Claims, 18 Drawing Figures

BEAM ALIGNMENT SYSTEM FOR LASER WELDING SYSTEM

CROSS-REFERENCE TO COPENDING APPLICATIONS

Attention is drawn to the following copending, commonly assigned applications, all/each filed on even date and incorporated specifically by reference into the instant specification:

(1) "FUEL GRID WITH SLEEVES WELDED IN NOTCHED GRID STRAPS" (Westinghouse Case No. 49,420), by R. Duncan, Ser. No. 414,232;

(2) "PULSED LASER MACHINING APPARATUS" (Westinghouse Case No. 49,422), by R. A. Miller and G. D. Bucher, Ser. No. 414,264;

(3) "APPARATUS AND METHOD FOR LASER MACHINING IN NON-REACTIVE ENVIRONMENT" (Westinghouse Case No. 49,720), by R. A. Miller and G. G. Lessman, Ser. No. 414,242;

(4) "STRAP AND VANE POSITIONING FIXTURE FOR FUEL ROD GRID AND METHOD" (Westinghouse Case No. 49,721), by R. F. Antol, R. W. Kalkbrenner and R. M. Kobuck, Ser. No. 414,197;

(5) "GRID ASSEMBLY FIXTURE, RETENTION STRAP AND METHOD" (Westinghouse Case No. 49,722), by R. M. Kobuck and R. W. Kalkbrenner, Ser. No. 414,198;

(6) "LASER MACHINING SYSTEM" (Westinghouse Case No. 49,723), by D. L. Wolfe, J. W. Clements and J. S. Kerrey, Ser. No. 414,241;

(7) "MOVABLE MACHINING CHAMBER WITH ROTATABLE WORK PIECE FIXTURE" (Westinghouse Case No. 49,938), by R. F. Antol, R. Kalkbrenner and D. L. Wolfe, Ser. No. 414,263;

(8) "WORK PIECE GRIPPING AND MANIPULATING APPARATUS FOR LASER WELDING SYSTEMS AND THE LIKE" (Westinghouse Case No. 49,961), by R. Kalkbrenner and R. Kobuck, Ser. No. 414,263;

(9) "WELDING PLATES FOR A FUEL ROD GPID" (Westinghouse Case No. 50,107), by R. M. Kobuck, R. Miller, R. W. Kalkbrenner, J. Kerrey and R. Duncan, Ser. No. 414,265;

(10) "PLURAL COMPUTER CONTROL FOR SHARED LASER MACHINING" (Westinghouse Case No. 50,288), by J. W. Clements and W. D. Lanyi, Ser. No. 414,204;

(11) "GRID AND SLEEVES WELDING FIXTURE AND METHOD" (Westinghouse Case No. 50,528), by J. S. Kerrey and R. Duncan, Ser. No. 414,203;

(12) "CALIBRATION OF AUTOMATED LASER MACHINING APPARATUS" (Westinghouse Case No. 50,529) by J. W. Clements and J. R. Faulkner, Ser. No. 414,272;

(13) "RIGID SUPPORT FOR LASER MACHINING APPARATUS" (Westinghouse Case No. 50,530), by D. L. Wolfe, Ser. No. 414,191; and (14) "LASER LENS AND LIGHT ASSEMBLY" (Westinghouse Case No. 50,106), by R. Antol, R. W. Kalkbrenner and R. M. Kobuck, Ser. No. 414,205.

BACKGROUND OF THE INVENTION

1. Field of the Invention

This invention, in its preferred form, relates to apparatus for laser machining a work piece and more particularly to apparatus for focusing and directing a laser beam onto the work piece. More particularly, this invention relates to apparatus for aligning the laser beam accurately such that repositioning of the laser focusing lens position does not displace the focal spot of the laser on the work piece.

2. Description of the Prior Art

Figure 1:
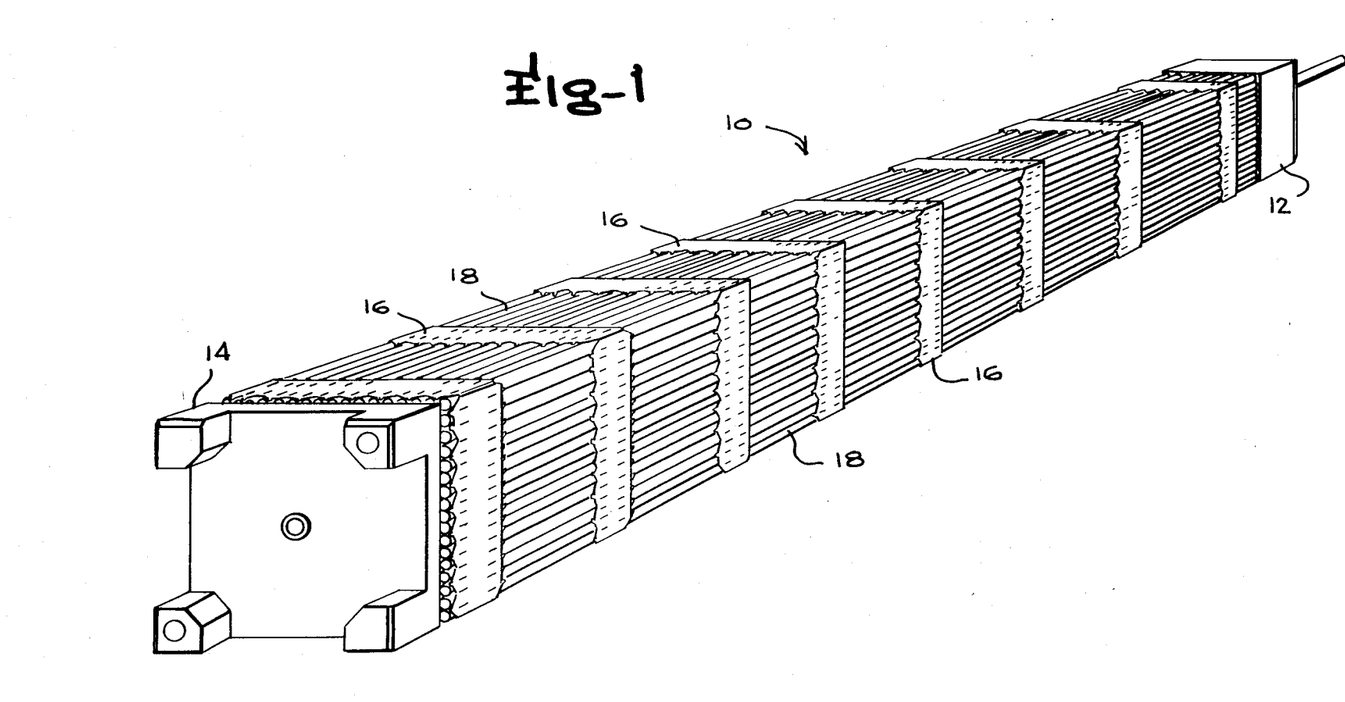
FIG. 1 is a perspective view of a nuclear fuel bundle assembly incorporating a plurality of grids.

The precision laser machining apparatus of this invention relates generally to the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assembly 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and, therefore, the orientation of the fuel rods 18 with respect to each other is rigorously controlled.

Figure 2A:
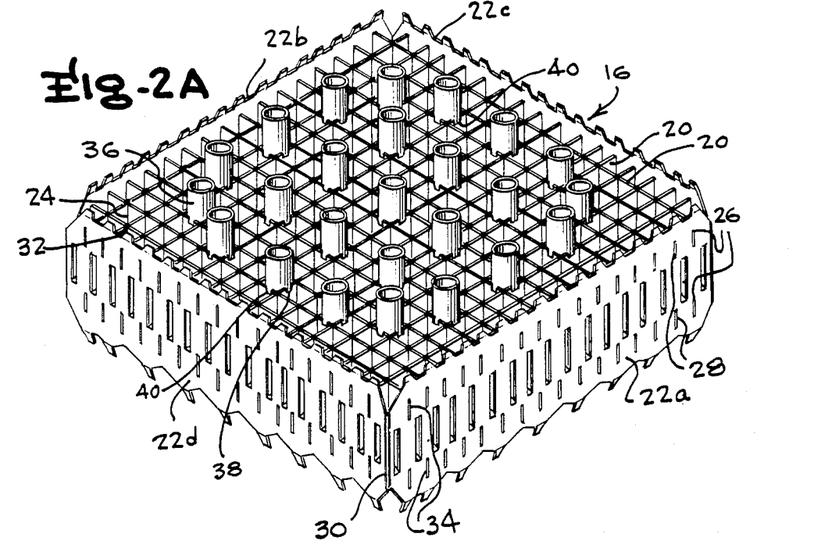
FIGS. 2A, 2B and 2C are respectively a perspective view, a plan view and a sectioned side view of a fuel rod grid as incorporated into the assembly of FIG. 1.
Figure 2B:
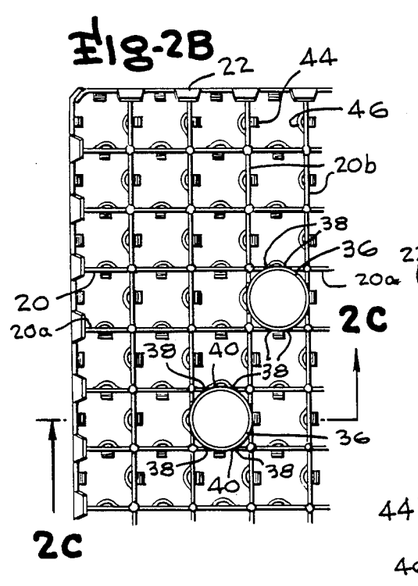
Figure 2C:
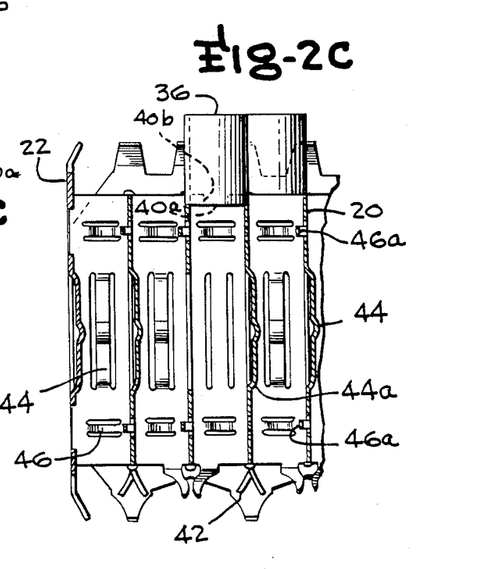

The precision laser welding apparatus of this invention is, in one illustrative embodiment thereof, related to the manufacture of fuel rod grids 16 as shown in FIGS. 2A to 2C. The fuel rod grid 16 is of an approximately square configuration, whose periphery is formed by four outer grid straps 22. Each end of an outer grid strap 22 is welded by a corner seam weld 30 to the end of a perpendicularly disposed outer grip strap 22. A plurality of inner grid straps 20 is disposed in rows and columns perpendicular to each other, whereby a plurality of cells are formed to receive the control rods and the nuclear fuel rods 18. The inner grid straps 20 disposed along the rows and columns have complementary slots therein at each of the points 24 of intersection for receiving a perpendicularly disposed inner grid strap 20. An intersect weld 32 is formed at each of the points 24 of intersection, whereby a rigid egg crate structure is formed. Further, each of the inner grid straps 20 includes at each end a pair of tabs 26 of a size and configuration to be tightly received in either a top or bottom row of slots 28 formed in the outer grid straps 22, as shown in FIG. 2A. A slot and tab weld 34 is effected along the top and bottom rows formed by the slots 28 within the outer grid straps 22.

Further, a plurality of guide sleeves 36 is disposed on the sleeve side surface of the fuel rod grid 16 to receive and guide the control rods disposed therein. A series of notch seam welds 40 securely attaches the guide sleeves 36 to corresponding notches 38 formed within the inner grid straps 20. The precision laser welding apparatus of this invention is particularly adapted to perform a series of controlled welding operations whereby each of the welds 30, 32, 34, and 40 is carried out. It is understood that after each such weld, the fuel rod grid 16 is repositioned and/or the focal point of the laser beam changed to effect the particular type of weld desired.

Referring now to FIGS. 2B and 2C, the plurality of resilient fingers 44 is disposed longitudinally of the inner grid straps 20 in a parallel relationship to each other. A pair of spacing fingers 46 is disposed on either side of a corresponding resilient finger 44 and serves along with the resilient finger 44 to provide a resilient grip of the nuclear fuel rods 18 that are disposed within the cell formed by the intersecting inner grid straps 20. A resilient finger 44a is disposed to the right as seen in FIG. 2C in an opposing relationship to the spacing finger 46a, whereby a nuclear fuel rod 18 is resiliently held therebetween.

The fuel rod grid 16 is machined and in particular welded. In order to perform the intersect welds 32, the fuel rod grid 16 is incrementally moved along each of its X and Y axes, stopping at each of a plurality of positions wherein the laser beam is aligned with each of the intersections of the inner grid straps 20. Once positioned, a laser source is energized to emit a laser beam onto the aligned point of intersection to thereby effect an intersect weld 32. Thereafter, the fuel rod grid 16 is moved to the next position and another intersect weld 32 is made. The slot and tab welds 34, as well as the corner seam welds 30, are made by rotating the fuel rod grid 16 about its Y axis so that each of its outer grid straps 22 is presented to the laser beam for welding. In addition, notch seam welds 40 securing the guide sleeves 36 within the notches 38 of the inner grid straps 20 are carried out by rotating the fuel rod grid 16 to a position disposed at an angle of 45° with respect to the laser beam to thereby expose the interface between the guide sleeves 36 and the slots 38 to the laser beam. The laser beam is initially focused to perform the intersect welds 32 as are carried out within a single plane in which the intersect welds lie. In order to make the corner seam welds 30 and the slot and tab welds 34, it is necessary to rotate the fuel rod grid 16 out of the plane of the intersect welds 32, thus requiring the refocusing of the laser beam. In similar fashion, the fuel rod grid 16 is rotated from the plane of the intersect welds 32 to its 45° angle position with respect to the laser beam, thus also requiring a refocusing of the laser beam before precision welding may be carried out.

Figure 3:
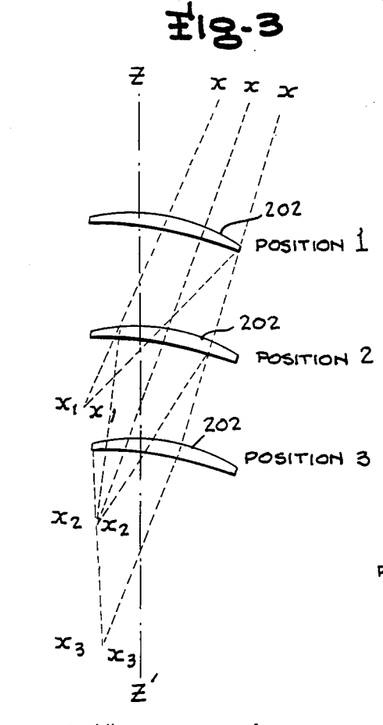
FIG. 3 is a side view of a laser focusing lens disposed at a plurality of positions to focus a laser beam at a plurality of corresponding focal planes, illustrating that in the absence of this invention the resulting focal spot may be laterally displaced and defective welds will result.

As described in the copending application entitled "LASER MACHINING SYSTEM" (Westinghouse Case No. 49,723); U.S. patent application Ser. No. 414,241, the refocusing of the laser beam is effected by a lens mounted within a laser focusing lens assembly that is rectilinearly moved in a controlled fashion such that the laser beam is refocused onto different focal planes corresponding to the elevation of each of the intersect welds 32, the corner seam welds 30, and the slot and tab welds 34. The laser beam passes through a beam expander, then reflected by a series of mirrors before being focused by the focusing lens 202, as illustrated in FIG. 3, onto the work piece, which may take the form of the fuel rod grid 16, as described above. As shown in FIG. 3, the focusing lens 202 may assume at least three different positions to effect the different welds, as described above. The axial displacement of the lens 202 along its axis Z-Z', which is the vertical axis of the lens assembly supporting the lens 202, causes the focal spot of the laser beam to be displaced laterally from its proper location resulting in inferior weld quality.

SUMMARY OF THE INVENTION

It is therefore an object of this invention to provide a new and improved apparatus for performing a plurality of precise laser machining operations.

It is a more specific object of this invention to provide a new and improved apparatus for focusing a laser beam with a high degree of precision onto a plurality of laser machining sites.

It is a still further object of this invention to provide a new and improved laser machining apparatus for repositioning a laser focusing lens, whereby the focal spot of the laser beam does not vary as the laser focusing lens is repositioned.

In accordance with these and other objects of this invention, there is disclosed apparatus for performing a plurality of laser machining operations. The laser machining apparatus comprises a laser for emitting a laser beam along a path and a laser focusing assembly disposed within the path and movable along an axis for variably focusing the laser beam onto a plurality of different focal spots corresponding to a plurality of laser machining operations. A mechanism is disposed to intercept the laser beam and to adjust a portion of the path of the laser to lie along the axis of the laser focusing assembly, whereby the lateral displacement of each of the focal spots from the axis of the laser focusing assembly is reduced when the focusing assembly is moved along its axis to refocus the laser beam.

In a further aspect of this invention, an alignment target is mounted within said path to cast a shadow in the laser beam, the configuration of the shadow indicative of whether or not the path is aligned with the axis. A display member is disposed to intercept the shadow, whereby an operator may view the shadow and adjust the alignment assembly such that the laser path is aligned with the axis.

In a still further embodiment of this invention, the laser emits a single laser beam that is directed by a beam switching mirror disposed in a first position along a first path and along a second path when said beam switching mirror is disposed in a second position. First and second alignment mechanisms are disposed to respectively receive and direct said laser beam as directed along said first and second paths along third and fourth paths, respectively. First and second laser focusing assemblies are disposed within said third and fourth paths respectively to variably focus the laser beams onto corresponding pluralities of focal spots.

In a further feature of this invention, there is incorporated a pair of alignment targets disposable within either of said third or fourth paths to cast a shadow, whose image is indicative of whether or not the third or fourth path is aligned with respect to the axis of its laser focusing assembly.

In a still further aspect of this invention, each of the first and second aligning mechanisms includes a pair of steering mirrors. The first steering mirror of a pair is disposed to receive the laser beam as directed along said first or second path. The second steering mirror is disposed to receive the laser beam from the first steering mirror and to redirect the laser beam along the third or fourth path. Each of the first and second steering mirrors is adjustably disposed to achieve the desired alignment of the third or fourth path with respect to the axis of its laser focusing assembly.

BRIEF DESCRIPTION OF THE DRAWINGS

A detailed description of a preferred embodiment of this invention is hereafter made with specific reference being made to the drawings in which.

DESCRIPTION OF THE PREFERRED EMBODIMENT

Figure 4:
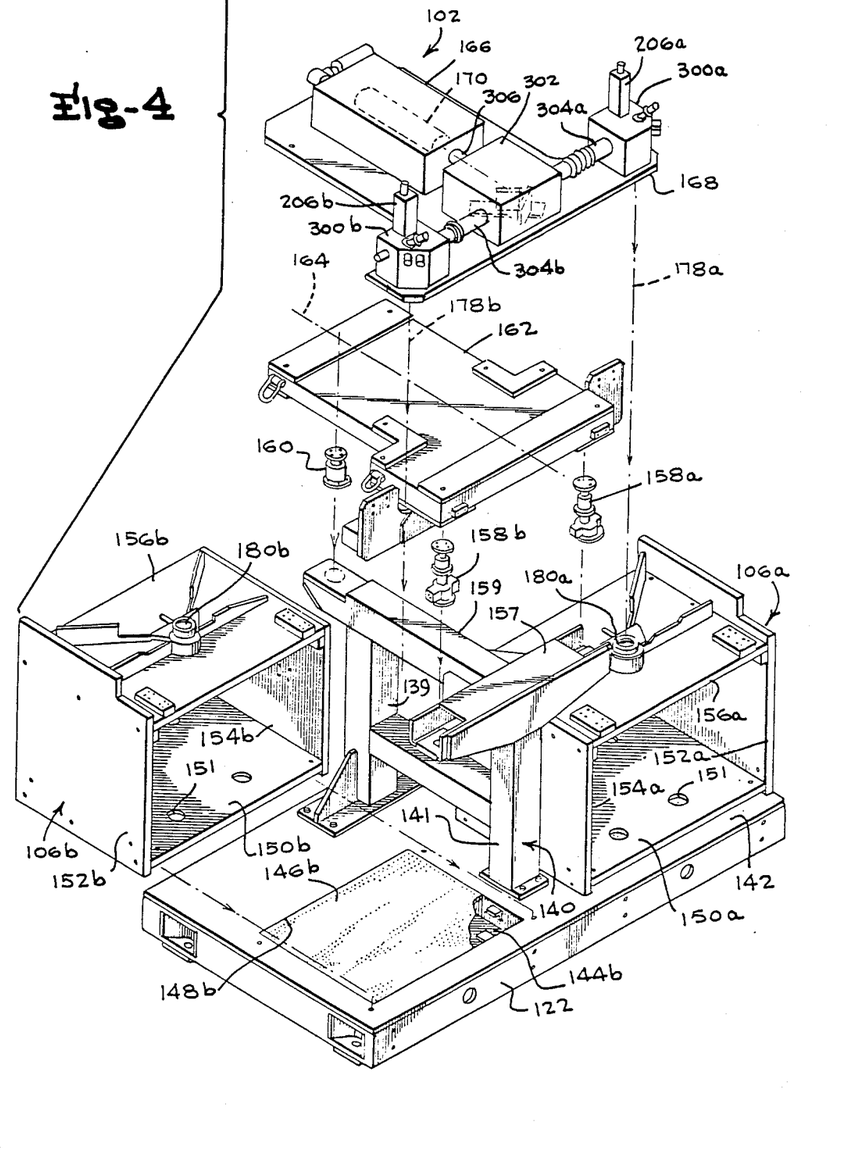
FIG. 4 is an exploded perspective of the structural support system for a laser welding apparatus and including a main frame and a kinematic support for rigidly supporting a laser system with respect to a pair of work pieces, e.g., nuclear fuel rod grids.

Referring now to FIG. 4, there is shown a laser welding system 102 for controlling the series of welds and, in particular, the intersect welds 32, the slot and tab welds 34, the corner seam welds 30, and the notch seam welds 40 necessary to secure the inner and outer grid straps 20 and 22 together to form the fuel rod grid 16 and to secure the guide sleeves 36 to the grid 16 by controlling the laser system 102 to emit and to focus a laser beam 169 onto the grid 16. Each of the work pieces, e.g., the fuel rod grids 16, is successively moved to each of the weld positions by its positioning module 106a or 106b, the module 106a being shown in FIG. 4.

Figure 5:
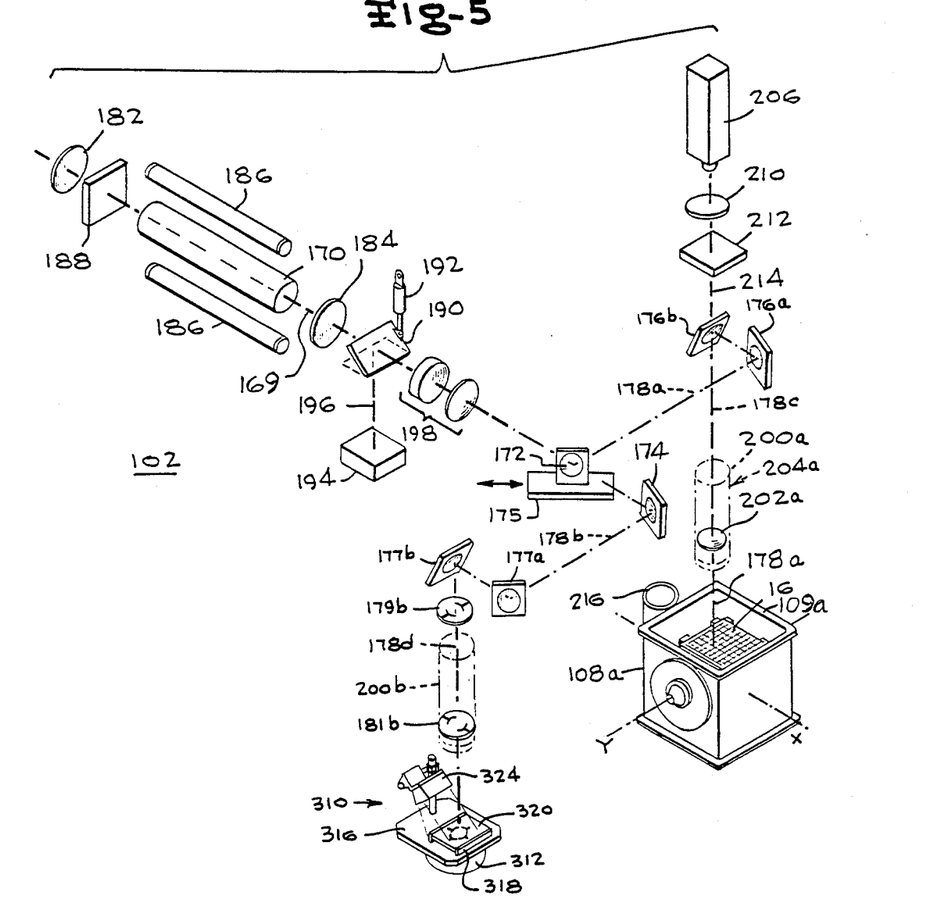
FIG. 5 is a perspective, schematic representation of the laser system, as supported by the structural support system of FIG. 4, for generating and for directing on a time shared basis a laser beam emitted from a single laser source to each of the two work pieces.

In particular, a welding chamber 108, as shown in FIG. 5, is associated with each of the positioning modules 106 for receiving its grid 16 to establish an environment in which the laser welding may be carried out and, in particular, to establish an atmosphere of an inert gas, such as argon, while permitting movement of the grid 16 to effect the series of welds. A main frame 122 mounts adjustably the laser system 102 in an aligned position with respect to the right and left positioning modules 106a and 106b. Once aligned with the laser system 102, the right and left positioning modules 106a and 106b are fixedly secured with respect to the main frame 122 and therefore with respect to the laser system 102 to ensure that the alignment of the laser beam 169 may be accurately controlled with respect to each of the positioning modules 106a and 106b and therefore with respect to the fuel rod grids 16 carried thereby. The main frame 122 is made up of a top plate 142 and a bottom plate (not shown), each welded to a frame of square tubing. The top plate 142 is machined flat after it has been welded to its frame of square tubings to provide a reference surface for the other system components that are mounted thereon. These other components are bolted or doweled to or with respect to the top plate 142 so that the critical alignments can be maintained.

A kinematic support 140 is bolted to the top plate 142 and comprises a pair of legs 141 and 139 each having a dowel pin securing it with respect to the top plate 142. Each of the positioning modules 106 is mounted on the main frame 122 and comprise, as shown in FIG. 4, a base plate 150 bolted to the top plate 142 at each of its four corners. Each positioning module 106 includes side walls 152 and 154, each bolted to the base plate 150. Each of the positioning modules 106 further includes a top or sealing plate 156 that is disposed in a close spacing, i.e., less than 0.040 inch, from sealing flanges 109a and b, which are disposed about the openings of their respective welding chambers 108a and 108b, as shown in FIG. 5.

The kinematic support 140 positions the laser system 102, as will now be more fully described with respect to FIG. 5 and, in particular, the source of laser emission in the form of a laser rod 170 and the related optics with respect to the reference surface of the main frame 122 and the fuel rod grids 16. The laser rod 170 is disposed within a laser head housing 166 and is mounted upon an optical tooling plate 168 which has been machined to very close tolerances for flatness. The optical tooling plate 168 is mounted upon a laser subbase 162 which is in turn supported upon the kinematic support 140 and, in particular, upon its cross beam 157 and horizontal member 159. In addition to the laser head housing 166, a movable beam switching mirror 172 and its actuator in the form of a driver and stationary beam diverters in the form of mirrors 174, 176a and 176b, and 177a and 177b are also mounted upon the optical tooling plate 168. As shown in FIG. 7B, the beam switching mirror 172 is mounted by a switching mirror holder 331, which is in turn supported on a mirror switching table 175. The mirror switching table 175 is rectilinearly driven along the arrow 327 between a position intercepting the laser beam 169, as shown in full line in FIG. 7B, and a second position, as shown in dotted line in FIG. 7B, whereby the laser beam 169 intercepts the stationary member 174 to be directed to the left, as shown in each of FIGS. 7B and 5. The mirror switching table 175 is driven by an electrically energizable solenoid taking the form of a linear induction motor as made by Anorad Inc.

The laser subbase 162 supports the optical tooling plate 168 and, in turn, is mounted upon the kinematic support 140. The kinematic support 140 is a weldment made of square tubing and provides the rigidity necessary to maintain the critical alignment between the laser beam 169 emitted from the laser rod 170, and the fuel rod grids 16. The laser subbase 162 is bolted to a pair of leveling jacks 158a and 158b disposed at either end of the cross beam 157. A spherical bearing 160 is disposed on a rearward portion of the horizontal member 159 to provide a single point of support for the laser subbase 162, whereby it may rotate about an axis 164 as each of the front leveling jacks 158a and 158b is raised or lowered. The spherical bearing 160 is disposed at a fixed height to provide a pivot about which the laser subbase 162 may be either lifted straight up or tilted to the required angle by the leveling jacks 158a and 158b.

The plane of the laser subbase 162 must remain rigid while the jacking forces are applied thereto by the leveling jacks 158A and 158B during the initial alignment of the laser welding system 100. As will be explained below, the laser subbase 162 also supports a pair of laser focusing lens assemblies 204 (see FIGS. 5, 7A and 11) may be rectilinearly adjusted to focus the laser beam 169 onto the fuel rod grids 16 within the corresponding welding chambers 108. The laser subbase 162 supports in a manner that the laser focusing lens assembly 204 is capable of being aligned so that its Z-axis is perpendicular to the top surface of the laser subbase 162. As shown in FIGS. 4 and 5, the laser rod 170 emits a laser beam 169 that is directed onto the beam switching mirror 172, which alternately directs along a path 178a the laser beam 169 first to a pair of steering mirrors 176a and 176b, and then along a path 178b to a second pair of steering mirrors 177a and 177b. The laser beams directed along paths 178a and 178b are directed through openings 180a and 180b within the positioning modules 106a and 106b respectively.

The laser system 102 as shown in FIG. 4 and schematically in FIG. 5 may, in one illustrative embodiment of this invention, takes the form of that laser system manufactured by Raytheon under their model designation number SS500. The laser system 102 includes the laser rod 170 illustratively taking the form of a Nd:YAG crystal laser and a pair of linear krypton flash lamps 186 disposed in a high efficiency laser head. The laser head includes a total reflecting mirror 182 and a partial reflecting mirror 184 disposed on either end of the laser rod 170. An innercavity shutter 188 is disposed between the laser rod 170 and the total reflecting mirror 182 and is selectively controlled to release a selected number of lasing pulses, whereby the energy imparted to effect laser welding may be precisely controlled. The laser head is modularly constructed to permit all optic elements thereof including the laser rod 170, the excitation lamps 186, and the mirrors 182 and 184 to be easily and independently replaced. The excitation lamps 186 shall be quickly replaced without disturbing the optical alignment. Further, the excitation or flash lamps 186 are water cooled over their entire length, including their end connectors. Lamp triggering provides for parallel pulsing of the excitation lamps 186 by energizing the cavity. The laser rod 170 shall illustratively be selected such that 400 watts average power is obtained at the work piece with the input power to the pulse forming network not to exceed 18 KW, when operating at pulse widths of 6 ms and 2 ms and pulse rates of 20 Hz and 50 Hz respectively.

A dump shutter 190 is disposable in a first position to direct the laser beam 169 along a diverted path 196 into a beam absorber 194 during those periods in which the work pieces in the form of the fuel rod grids 16 are being changed within the chambers 108. An actuating mechanism 192 is shown for disposing the shutter 190 from its first beam intercepting position to a second position, wherein the beam 169 is directed by a beam expander lens assembly 198 to the beam directing mechanism comprised of the movable beam switching mirror 172 and the stationary mirror 174. When the switching mirror 172 is disposed to intercept the laser beam 169, it is diverted along path 178a to the pair of vertically directing mirrors 176a and 176b to be directed vertically. The laser focusing lens assembly 204a intercepts and focuses the vertically directed beam onto the fuel rod grid 16 within the chamber 108a. As shown, the laser focusing lens assembly 204, as will be described in detail later, includes the laser focusing lens 202 and a lens carrier tube 200. When the switching mirror 172 is disposed by the mirror switching table 175 from a position intercepting the laser beam 169, it is diverted by the stationary reflective mirror 174 to form the laser beam as directed by the pair of vertically directing mirrors 177a and 177b towards the welding chamber 108b.

Figure 6:
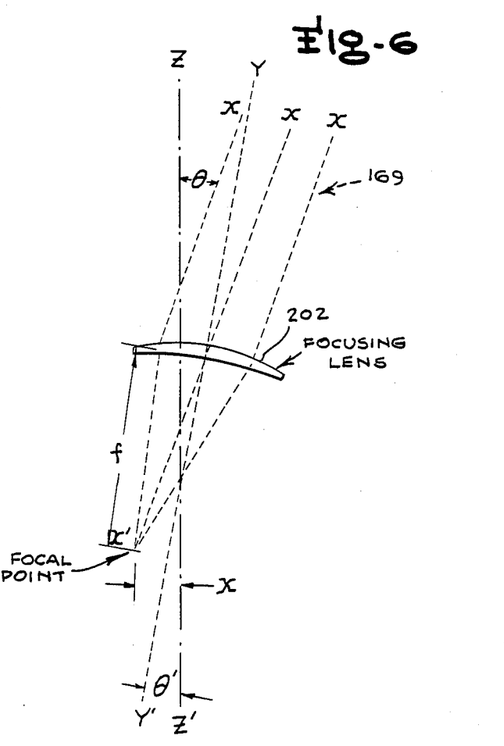
FIG. 6 is a side view of the laser focusing lens of FIG. 3, illustrating the lens axis, the path of the laser beam, and the axis along which the laser lens is repositioned to refocus the laser beam.

FIG. 6 shows an example of the refraction of the laser beam 169 by the focusing lens 202 to produce a focal spot. The laser focusing lens 202 is illustrated in FIG. 6 as being misaligned with respect to the Z-Z' axis along which the laser focusing lens 202 and its laser lens assembly 204 is moved to refocus the lens 202, i.e., the true optical axis Y-Y' of the laser focusing lens 202 is disposed slightly off of center and tipped relative to Z-Z' axis. This optical axis Y-Y' is set at an angle $\theta'$ relative to Z-Z' axis. The rays X-X' of the laser beam 169 are incident on the focusing lens 202 at an angle $\theta$ relative to the Z-Z' axis. For simplicity, FIG. 6 shows all of the lines Z-Z', Y-Y', and X-X' in a common plane. In general, these lines will be oriented in different directions so that no two of them lies in a common plane.

FIG. 6 shows the rays of the laser beam being focused by the focusing lens 202 to a common focal spot X'. This focal spot X' is located a distance f (the focal distance) from the focusing lens 202 and is displaced laterally a distance X from the Z-Z' axis. If the Z-Z' and X-X' are misaligned, the lateral displacement X of the focal spot X' varies as the laser focusing lens 202 is moved along the Z-Z' axis. The simple ray tracing sketch of FIG. 3 shows three different vertical positions of the focusing lens 202 and correspondingly three different lateral displacements of the focal spot, i.e. $X_1$, $X_2$ and $X_3$. From geometrical optics one can show that the variation in lateral displacement X relative to the displacement $X_0$ corresponding to some vertical reference position of the lens can be expressed as $$X - X_o \approx \frac{fZ\Delta\theta_M \sin\theta \cos\theta}{d - Z\Delta\theta_M \cos\theta}$$

where f is the focal length of the lens, Z is the vertical displacement from the reference position, $\Delta\theta_M$ is the beam divergence imparted by the beam expander 198, $\theta$ is the angle of the incident laser beam 169 relative to the axis Z-Z', and d is the laser beam diameter at the position of the laser focusing lens 202.

There are two special cases for the above equation that will be considered. First, assume that $\theta = 0$, which corresponds to perfect alignment of the incident laser beam 169 with the Z-Z' axis. In this case, the displacement $X-X_0=0$ for all values of Z, i.e., the desired situation is realized. Consider, second, the case when the laser beam 169 has no divergence, i.e., $\Delta\theta_M=0$. Again, in this case one also has $X-X_0=0$ for all values of Z.

Lateral displacements $X-X_0$ of the weld spot varies as a function of the vertical displacement Z of the focusing lens 202. Thus, as shown in FIG. 6, the reduction of the angle $\theta$ between the Z-Z' axis and the rays X-X' of the laser beam 169 to zero or a minimum value, will substantially reduce the displacement $X-X_0$ of the focal spots even if the position of the focusing lens 202 is changed.

FIG. 5 discloses a laser welding system 102 adapted in accordance with the teachings of this invention to permit alignment of the laser beam 169 with respect to the Z-Z' axis, as shown in FIG. 6, along which the laser lens assembly 204 rectilinearly moves. As shown in FIG. 5, the laser beam 169, in a first mode, is intercepted by the switching mirror 172 to be directed along the path 178a to be directed by a pair of steering mirrors 176a and 176b downward along a second, vertical path 178c. The focusing lens 202a of the laser lens assembly 204a focuses the laser beam onto the fuel rod grid 16 disposed within the right welding chamber 108a. In a second mode of operation wherein the switching mirror 172 is disposed to a second position out of alignment with the laser beam 169, the laser beam 169 is reflected by the stationary mirror 174 along the path 178b to be directed down by a pair of steering mirrors 177a and 177b along a second, vertical path 178d.

In the normal course of laser welding, the laser beam 169 as directed along the second segment path 178c is focused by the focusing lens 202a onto the fuel rod grid 16. Typically, before welding operations are carried out, it is necessary to align the laser beam 169 with respect to the Z-Z' axis, i.e. to reduce the angle $\theta$ to zero. This is carried out, as suggested in FIG. 5, by inserting a pair of alignment targets 179b and 181b in the second segment path 178d, whereby the pair of alignment targets 179b and 181b cast a shadow in the laser beam 169 onto a laser beam alignment display assembly 310. In the alignment process, as will be described below in detail, the focusing lens 202b is not required and is replaced by the lower alignment target 181b. The steering mirrors 177a and 177b are capable of being finely adjusted, as will be described in detail, such that the second segment path 178d of the laser beam 169 is centered on the two alignment targets 179b and 181b. If the second beam segment 178d between the steering mirror 177b and the lower alignment target 181b is parallel with respect to the Z-Z' axis of the laser lens assembly 204b and if the laser beam 169 is properly aligned with respect to the Z-Z' axis, then the angle $\theta$, as shown in FIG. 6, will be reduced toward zero and the lateral displacement of the focal point will be minimized when the lens assembly 204 is moved up and down to effect the different welds, as described above.

In the copending application entitled "LASER MACHINING SYSTEM" (Westinghouse Case No. 49,723); U.S. patent application Ser. No. 414,241, there is described a laser welding system similar to that illustrated in FIG. 5, except that a single vertically directing mirror is used in place of each of the pairs of steering mirrors 176 and 177, as shown in FIG. 5. An advantage of the use of the pair of steering mirrors 176a and 176b or 177a and 177b is that once the laser beam 169 has been aligned with respect to the switching mirror 172 and the stationary mirror 174, that these mirrors may be fixed in their position and the redirection of the laser beam along the vertical segment paths 178c and 178d is accomplished entirely by the adjustment of their respective pairs of steering mirrors 176a, 176b, 177a and 177b.

By the alignment of the stationary mirror 174, it is possible to align the laser beam 169 within the limits of maximum deviation from the laser beam paths 178a or 178b. The extent of maximum deviation depends on the angle of incidence of the laser beam 169 with respect to the stationary mirror 174 or the switching mirror 172. Such alignment can produce a significant angular deviation as the laser beam 169 is directed along one of the second segment paths 178c or 178d. To provide a fine alignment of the laser beam 169 using only two alignment targets 179 and 181, it is necessary that these targets 179 and 181 be disposed in the same segment of the beam path with no optical elements, i.e., mirrors, lens, etc. disposed therebetween. In a preferred embodiment of this invention, the alignment targets 179 and 181 are disposed within the second segment path 178d or 178c, as illustrated in FIG. 5.

Figure 7A:
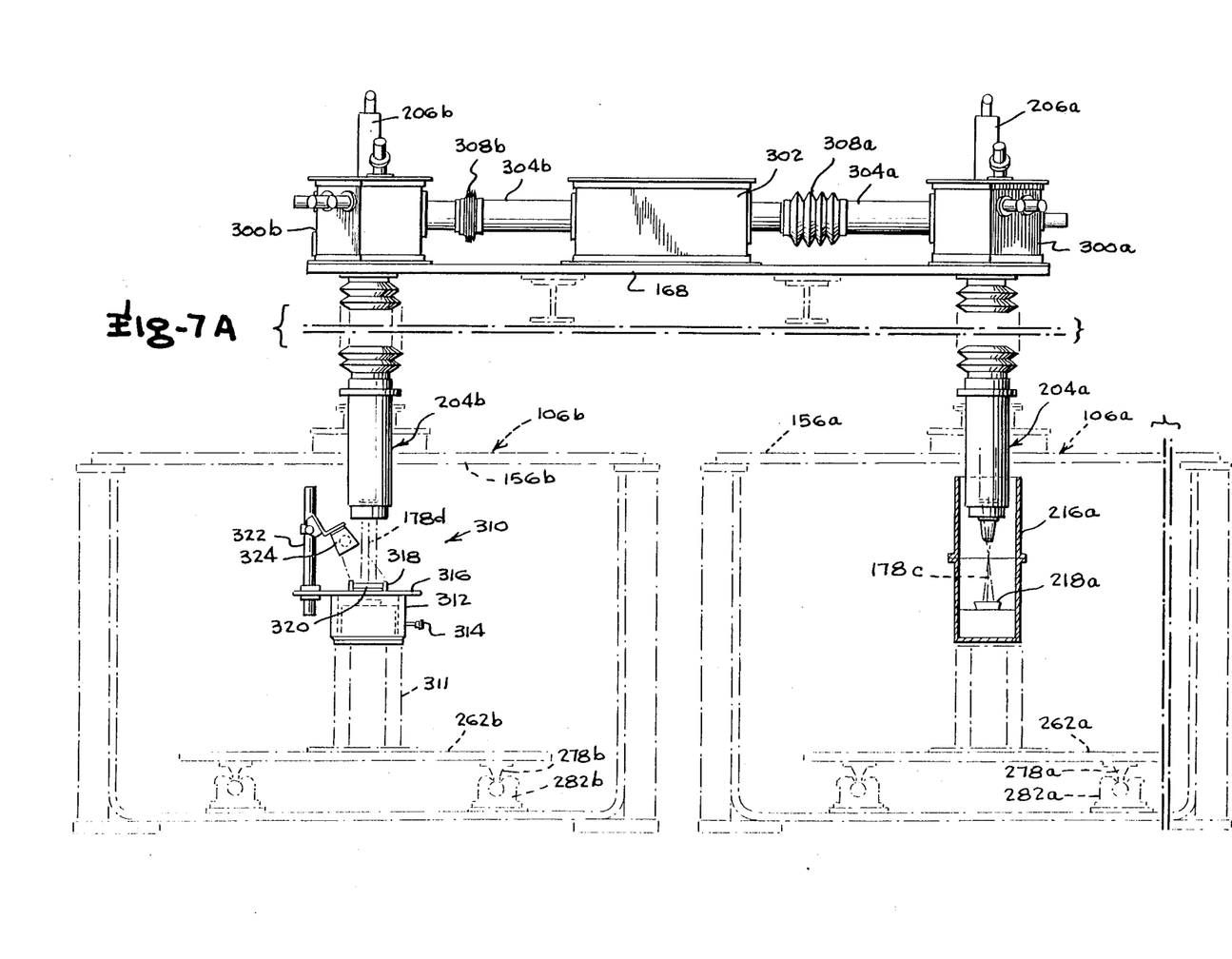
FIGS. 7A and 7B are respectively a front view of the laser welding system, as shown in FIGS. 4 and 5, particularly illustrating the steering mirror enclosures for receiving adjustable steering mirrors, laser lens assemblies, and a laser beam alignment display assembly for facilitating the alignment of the laser beam and the Z-Z' axes of the laser lens assemblies in accordance with the teachings of this invention, and a top, plan view of the laser welding system illustrating the arrangement of the steering mirrors for redirecting the laser beam from a horizontal to a vertical position and for permitting adjustment of the laser beam to achieve the desired alignment of the laser beam and the Z-Z' axes along which the laser focusing lens assemblies and their focusing lenses are transported.
Figure 7B:
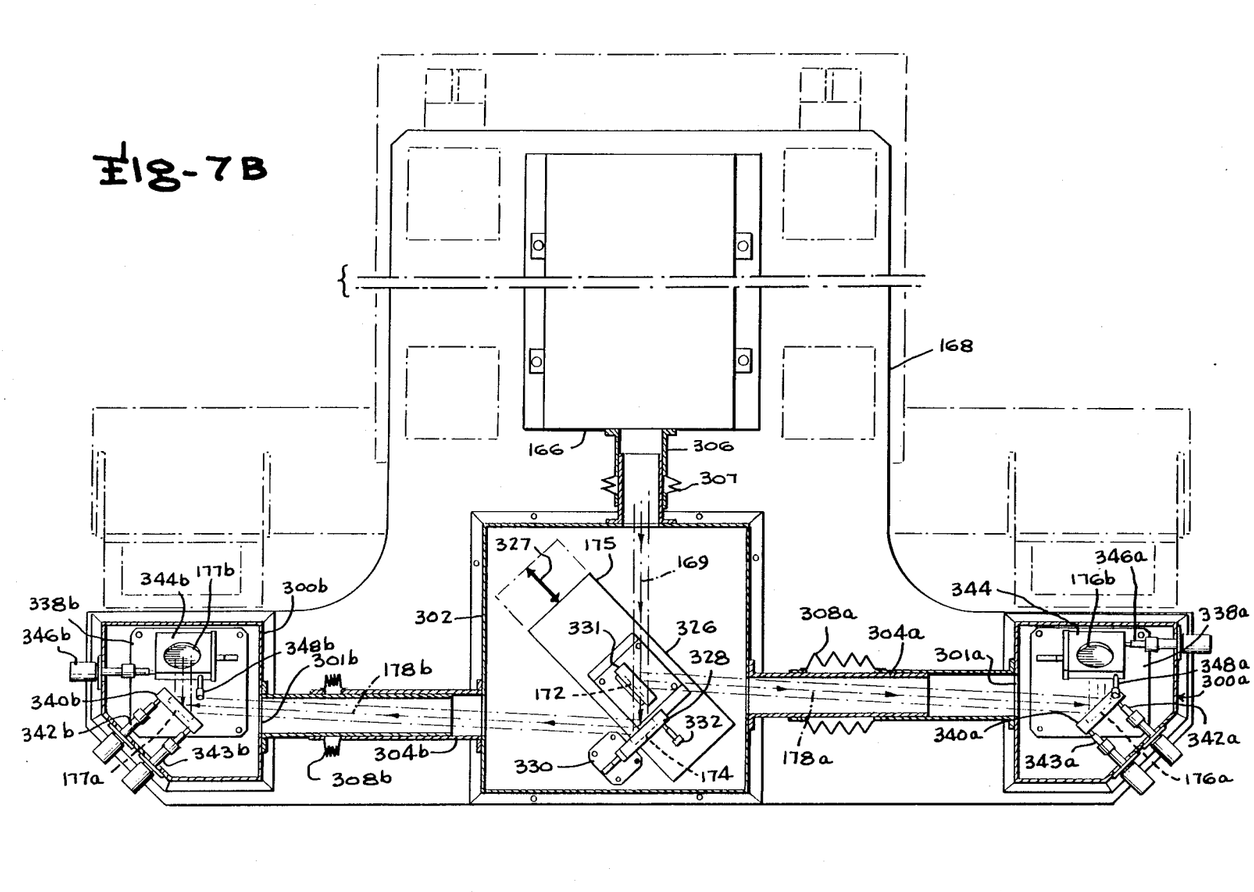

Referring now to FIGS. 7A and 7B, there is shown a preferred embodiment of this invention in which the switching mirror 172 and the pairs of steering mirrors 176a and 176b and 177a and 177b are mounted upon the optical tooling plate 168. In particular, the stationary mirror 174 and the switching mirror 172 are disposed within a steering mirror enclosure 302, which is in turn supported upon the optical tooling plate 168. The steering mirror enclosure 302 is coupled to the laser head housing 166 by telescoping interconnecting tubes 106 and a bellows 307. The laser beam 169 is directed through the interconnecting tubes 304 to strike, in the first mode, the switching mirror 172 and to be directed along the first or horizontal segment path 178 formed through telescoping interconnecting tubes 304a and a bellows 308a, via an opening 301a and into a right steering mirror enclosure 300a, wherein there is mounted the pair of steering mirrors 176a and 176b. In the second mode when the switching mirror 172 is disposed out of the path of the laser beam 169, it strikes the stationary mirror 174 to be reflected along the first or horizontal segment path 178b through the interconnecting tubes 304b, the bellows 308b, the opening 301b, and into a left steering mirror enclosure 300b, in which the pair steering mirrors 177a and 177b is mounted.

As shown in FIG. 7B, the switching mirror 172 is mounted upon a mirror switching table 175 which is activated to move in a rectilinear fashion by a solenoid device (not shown) which may take illustratively the form of a linear induction motor. The switching mirror 172 is disposed within a support bracket 331, which is in turn affixed to the mirror switching table 175. The stationary mirror 174 is mounted within an assembly 328 including an adjusting micrometer spindle 332. The assembly 328 is in turn supported upon the optical tooling plate 168 by a support bracket 330. The spindle 332 permits fine, rotational adjustment of the stationary mirror 174 about an axis extending vertically or perpendicular with respect to FIG. 7B. By adjustment of the micrometer spindle 332, the horizontal segment path 178b may be precisely set to direct the laser beam 169 into the left steering mirror enclosure 302 and onto the steering mirror 177a.

Referring now to FIG. 7A, the laser beam 169 is directed to each of the right and left positioning modules 106a and 106b via corresponding lens assemblies 208a and 208b. The laser beam 169 is directed along the lower segment path 178c to strike a thermal pile 218 as disposed within a shield tube 216. The shield tube 216a is mounted upon a slide table 262a that is movable rectilinear into and out of the right positioning module 106a, whereby the shield tube 216a and its thermal pile 218a may be disposed to receive the incident laser beam 169. As described in copending application entitled "CALIBRATION OF AUTOMATED LASER MACHINING APPARATUS"; (U.S. patent application Ser. No. 414,272), the thermal pile 218a provides an output signal indicative of the power of the incident laser beam 169, whereby the laser rod 170 may be variably excited to maintain constant the power of the incident laser beam 169.

The laser beam 169 is directed into the left positioning module 106b by the lens assembly 204b along the lower segment path 178d to fall upon the laser beam alignment display assembly 310. As will be explained, the assembly 310 is used to achieve accurate alignment of the lower segment path 178d with respect to the Z-Z' axis along which the laser assembly 204 moves. As shown in FIG. 7A, the assembly 310 comprises a beam pattern display member 320, which is illuminated with ultra-violet radiation emanating from a lamp 324 which is in turn suspended by a support bracket 322. Both the bracket 322 and the beam pattern display member 320 are mounted upon a display table 316. In turn, the display table 316 is integrally connected to a mounting bracket 312 whereby the display table 316 is releasably supported upon a pair of support legs 311. The laser beam alignment display assembly 310 is supported by its legs 311 upon a slide table 262b. A pair of bearing shafts 278b is affixed to the lower side of the slide table 262b and is in turn movably supported upon a pair of corresponding pillow blocks 282b, whereby the slide table 262b may be rectilinearly moved out of and into the left positioning module 106b. In order to carry out the alignment process as by the teachings of this invention, the slide table 262b is withdrawn from the left positioning module 106b and the laser beam alignment display assembly 310 mounted thereon before being redisposed within the left positioning module 106b so that the laser beam 169 may be directed along the lower segment path 178d and onto the beam pattern display member 320, as shown in FIG. 7A.

Figures 8A, 8B, 9A, 9B:
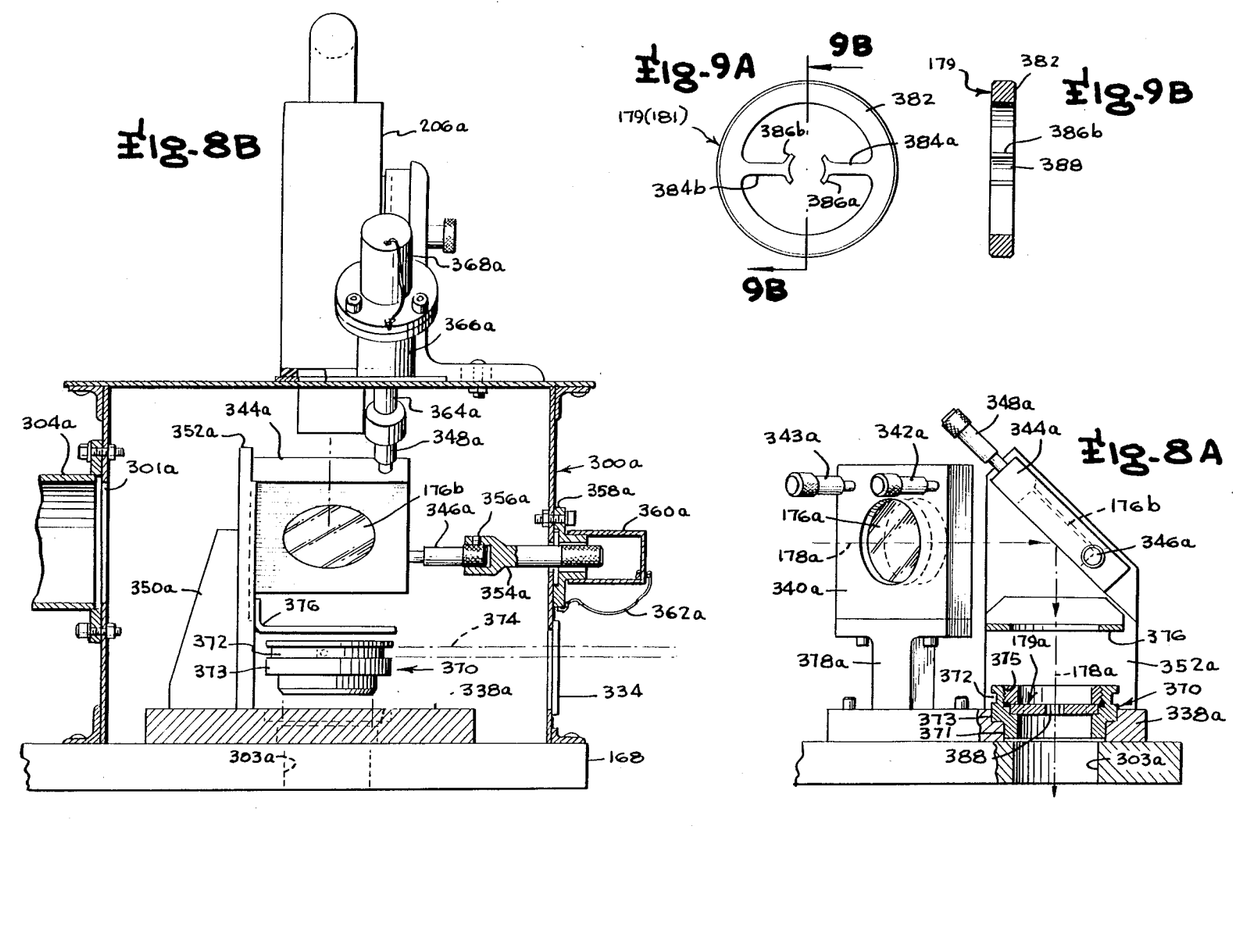
FIGS. 8A and 8B are respectively a side, elevational view and a front, elevational view of the steering mirrors for redirecting the horizontally oriented laser beam along a vertically oriented path aligned precisely with respect to the vertical or Z-Z' axis.
FIGS. 9A and 9B are respectively a plan view and a sectioned view taken along line 9B—9B of FIG. 9A of the beam alignment target, in accordance with the teachings of this invention.

Referring now to FIGS. 8A and 8B, the details of the steering mirrors 176a and 176b and, in particular, the steering mirror assemblies 340a and 344a will be described. Referring first to FIG. 8A, the laser beam 169 is directed along the upper segment path 178a, which lies in a line perpendicular to FIG. 8A, onto the steering mirror 176a, which reflects the laser beam 169 to strike the steering mirror 176b. In turn, the steering mirror 176b directs the laser beam 169 downward along the lower segment path 178a through a beam exit opening 303a to be focused by the laser focusing lens 202a upon the fuel rod grid 16, as shown in FIG. 5. As will be explained later in detail with respect to FIG. 10, the steering mirror 176b is mounted within the steering mirror assembly 344 and includes a pair of adjusting micrometer spindles 346 and 348 for respectively adjusting the azimuth and elevation disposition of the steering mirror 176b. The steering mirror 176a is disposed within a similar, though not identical steering mirror assembly 340 including a pair of adjusting micrometer spindles 342 and 344 for adjusting respectively the azimuth and elevational setting of the steering mirror 176a. The steering mirror assembly 344 is affixed to an upright support member 52 whose bottom-most end is mounted upon a support base 338. A T-shaped mounting bracket 378 supports the bottom-most edge of the steering mirror assembly 340.

As shown in FIG. 8A, the support base 338 has a target opening 371 therein for receiving a target assembly 370. The target assembly 370 mounts the upper alignment target 179a, as will be more fully described with respect to FIGS. 9A and 9B. The target opening 371 includes an annularly-shaped flange 373 for receiving and positioning the target assembly 370, whereby the alignment target 179a is centered with respect to the vertically disposed lower segment path 178a of the laser beam 169. The alignment target 179 is held fixedly within the target assembly 370 by a retaining ring 375, which is threadably received within the target assembly 370. As illustrated in FIG. 8B, a target installation tool 374 having a pair of arms separated by a width corresponding to the diameter of an annular groove 372 disposed in the target assembly 370. To carry out alignment procedure, a removable door 334 is removed from the right steering mirror enclosure 300a and the target installation tool 374 is used to insert the target assembly 370 into the target opening 371. It is understood that in the course of the normal laser welding operations, that the target assembly 370 and its alignment target 179a is removed from the laser welding apparatus 102. A mirror shield 376 is mounted upon the support member 352a between the target assembly 370 and the steering mirror assembly 344a to protect the steering mirror 176b.

The alignment target 179 (or 181) is more fully shown in FIGS. 9A and 9B, as will now be further described. The alignment target 179 (or 181) includes an annular rim 382 having a pair of ring segments 386a and 386b aligned concentrically and supported respectively by a pair of struts 384a and 384b of the center point of the annular rim 382. The ring segments 386a and 386b form a beam opening 388, whose center is aligned with respect to the vertically disposed lower segment path 178a along which the laser beam 169 is directed, as shown in FIG. 8A.

Referring now to FIG. 8B, further details of the right steering mirror enclosure 300a will be described. As shown in FIG. 8B, a brace 350a is affixed to the support base 338a and is disposed at right angles to the support member 352a to provide further support and rigidity to the member 352a and its steering mirror assembly 344a. Federal safety regulations require that human operators be shielded from laser emission. FIG. 8B discloses mechanisms for permitting adjustment of the micrometer spindles without exposing the operator to laser emission. In particular, the micrometer spindles 346a and 348a associated with the steering mirror assembly 344a and its steering mirror 176b are associated with corresponding spindle extensions 354a and 364a, respectively. The spindle extension 354 is broken way in FIG. 8B to illustrate a set screw 356a that secures the spindle extension 354a to the adjusting micrometer spindle 346a, whereby the operator may rotate the extension 354a and thereby rotate the micrometer spindle 346a. The extension 354a extends through an opening within the right steering mirror enclosure 300a. A support bracket 358a is affixed to the side wall of the steering mirror enclosure 300a for receiving a protection cap 360a tethered to the enclosure 300a by a retaining strap 362a. The operator simply removes the protection cap 360a to obtain access to the spindle extension 354a. As also illustrated in FIG. 8B, the spindle extension 364a extends upward within an extension housing 366a. The operator may rotate the micrometer spindle 348a by removing a protection cap 368a to gain access to a remote end of the spindle extension 364a and, if needed for alignment, may rotate the extension 364a and its attached micrometer spindle 348a.

As shown in FIGS. 5 and 8B, a television camera 206 to be used in the laser beam alignment process is mounted upon the right steering mirror enclosure 300a. As indicated in FIG. 5, the television camera 206 is mounted upon an axis 214 aligned with the lower segment path 178c. A Bureau Of Radiological Health (BRH), or safety, shutter 212 is disposed to intercept the axis 214. A lens 210 serves to focus, as will be explained, the images formed by the upper and lower alignment targets 179 and 181 on the laser beam alignment display assembly 310 onto the television camera 206, whereby the operator may view a CRT display to assist in the adjustment of the pairs of steering mirrors 176 and 177, as will be explained.

Figure 10:
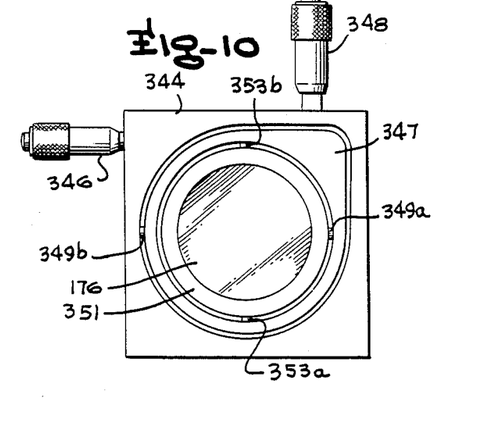
FIG. 10 is a front, elevational view of a steering mirror assembly as incorporated into the laser welding system as shown in FIGS. 7B, 8A and 8B.

The steering mirror assembly 344a, as generally shown in FIGS. 8A and 8B, is more fully shown in FIG. 10. It is understood that the steering mirror assembly 340 and the stationary mirror assembly 328, though not identical to the steering mirror assembly 348, closely resemble this assembly. The steering mirror assembly 344 includes an outer gimbal ring 347 and an inner gimbal ring 351. The outer gimbal ring 347 is mounted by a pair of bearings 349a and 349b from the assembly 344 to permit rotation about a horizontal axis to provide elevational adjustment. It is understood that the micrometer spindle 348 may be rotated to finely adjust the position of the outer gimbal ring 347 and therefore the steering mirror 176. The inner gimbal ring 351 is mounted by a pair of bearings 353a and 353b to permit rotation of the inner gimbal ring 351 and the steering mirror 176 carried thereby about a vertical axis, as seen in FIG. 10. It is understood that the micrometer spindle 346 may be finely adjusted to precisely set the azimuth position of the inner gimbal ring 351 and its steering mirror 176. In an illustrative embodiment of this invention, the steering mirror assembly 344 may take the form of that assembly as manufactured by the Ealing Corporation under their model number 22-2125. The steering mirror assembly 340, as shown in FIG. 8A, may illustratively take the form of that optical mounting system as manufactured by the Ealing Corporation under their designation 22-2117.

Figure 11:
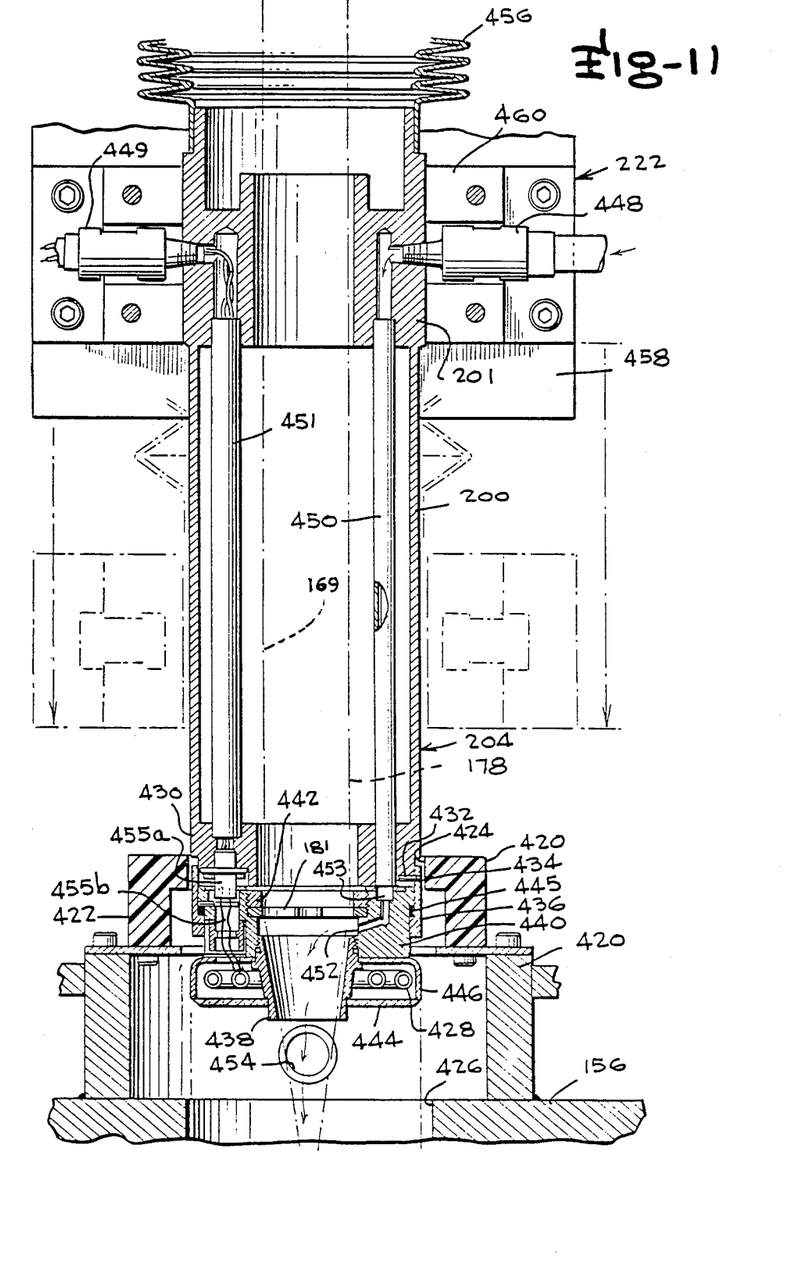
FIG. 11 is a sectioned view of the laser focusing assembly, as shown in FIGS. 5 and 7A.

Referring now to FIG. 11, there is shown in detail the laser focusing lens assembly 204 and, in particular, its shielding cap 422, to permit refocusing of the laser beam 169 upon the fuel rod grid 16. The assembly 204 includes the lens carrier tube 200 disposed vertically and aligned concentrically with respect to its laser beam 169. A tube base 430 is disposed at the bottom of and connected to the lens carrier tube 200 for removably receiving a lens mounting member 440. The mounting member 440 is configured to receive a locking ring 436 having a plurality of helical grooves 434, e.g., 3, disposed to receive a corresponding plurality of lock pins 432. Upon rotation, the locking ring 436 and its mounting member 440 may be locked to the tube base 430. A safety hood 438 is made of conical configuration to direct the focused laser beam 169 onto the work piece and has a threaded peripheral portion for engaging a set of threads upon the inner peripheral portion of the mounting member 430. In similar fashion, the lens 202 (not shown) or the lower alignment target 181, as shown in FIG. 11, is supported within a central opening of a mounting member 440 and is retained therein by a retaining ring 442 being peripherally threaded to engage a set of threads upon the mounting member 440, whereby the retaining ring 442 may be screwed onto the mounting member 440 to releasably retain the focusing lens 202. In normal laser welding operations, the laser focusing lens 202 is mounted within the assembly 204. In order to carry out the laser beam alignment process, as will be described, it is necessary to replace the laser lens 202 with the lower alignment target 181, as shown in FIGS. 9A and 9B. Replacement is carried out by removing the retaining ring 442, before inserting the beam alignment target 181, and replacing the retaining ring 442.

The safety hood 438 is disposed through an opening within a lamp hood 446 to affix the hood 446 to the mounting member 440. A pair of quartz-halogen lamps 428 is disposed within the lamp hood 446 to illuminate the work piece. The operating temperature of the lamps 428 prevents welding debris from collecting thereon. The operator aligns the work piece with respect to the laser beam 169 by viewing a CRT displaying the image as taken by the TV camera 206, whereby the operator may place its electronic rectical associated with the TV camera 206 on an initial weld site to determine an offset between a home position and the sited, first weld site; this offset is then automatically incorporated into the control signals as applied to the X-Y positioning system (not shown), whereby each of the welds is precisely positioned with respect to the laser beam 169. The lamps 428 are energized by wires directed to the lens hood 446 via an electrical input port 449 as inserted into a tube mounting portion 201 and a conduit 451 leading from the portion 201 to the tube base 430. In similar fashion, a flow of the inert gas, e.g., argon, is introduced into the space formed by the safety hood 438 and the lens 202 by an argon input port 448 threadably attached within an opening of the tube mounting portion 201 and therefrom via a conduit 450 leading to the mounting member 440. The mounting member 440 has an argon jet formed in alignment with the conduit 450, whereby the flow of argon is formed into a jet directed into the hood 438, whereby debris or contaminants as emitted during the welding process will be effectively removed so as not to attenuate the laser beam 178 focused onto the work piece. As seen in FIG. 11, the flow of argon escapes from the safety hood 438 into the space confined by the shielding ring 420 and the cap 422 to be exhausted via an output port 454.

Figure 12A:
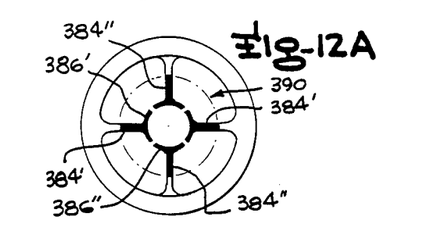
FIGS. 12A and 12B are views of the shadows cast by the laser beam as directed through a pair of beam alignment targets, as shown in FIGS. 9A and 9B, under the respective conditions, when the laser beam and Z-Z' axis are aligned and when the laser beam and Z-Z' axis are misaligned.
Figure 12B:
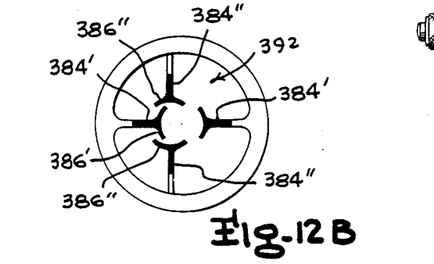

Referring now to FIGS. 5, 7A, 12A and 12B, the steps of the beam alignment technique will now be described. First, the slide table 262 is moved forward, out of its positioning module 106. With the slide table 262 disposed in its out position, the welding chamber 108 is disposed such that the laser beam alignment display assembly 310 may be mounted upon the slide table 262b, as shown in FIGS. 7A and 5. As mentioned above, the laser lens 202 is replaced with the lower alignment target 181. The focusing lens 210 associated with the television camera 206 is focused to produce a clear image of the shadow images that are projected onto the beam pattern display member 320, as shown in FIGS. 12A and 12B. The beam pattern display member 320 is illuminated with ultra-violet radiation from the lamp 324. The laser beam 169 striking the beam pattern display member 320 appears as a dark region, whereas the shadows 390 and 392, as shown in FIGS. 12A and 12B, appear as white or bright regions. The shadows 384' and 384" of the support struts 384 and the shadows 386' and 386" of the ring segments 386 also appear as white regions. The use of the alignment targets 179 and 181 is predicated on the condition that the upper alignment target 179a is mounted concentrically with respect to the Z-Z' axis and that the lower alignment target 181 is likewise mounted concentrically with respect to the Z-Z' axis. Further, the laser beam 169 does not substantially diverge and, therefore, the diameters of the arcuate segments 386a and 386b of both alignment targets 179 and 181 are approximately equal. FIG. 12B illustrates the case where the lower segment path 178c or 178d of the laser beam 169 and the vertical axis Z-Z' of the laser lens assembly 204 are not aligned with each other. Proper laser beam alignment is accomplished by adjusting the steering mirrors 176a and 176b or 177a and 177b. When alignment has been accomplished, the image of the shadow appears on the beam pattern display member 320, as illustrated in FIG. 12A. The shadows 368' and 368" of the ring segments 386 of the upper and lower alignment targets 179 and 181 appear to form a complete circle and the periphery of the completed circular pattern is concentric with respect to the circular shadows 386' and 386" corresponding to the arcuate members 386 of the alignment targets 179 and 181. Under this condition, the laser beam 169 is aligned with respect to the vertical Z-Z' axis of the laser lens assembly 204, thereby producing a minimum variation or lateral displacement of the focal spot as the laser lens 202 is moved up and down to accommodate the various welding operations.

The television camera 206 is capable of sensing motions corresponding to one-fourth to one-eighth of the thickness of the annular rims 382 of the alignment targets 179 and 181. These motions correspond to angular deviations of less than 0.05° of the laser beam 169. The lateral displacement of the focal spot, X', as shown in FIG. 6, is less than 0.001 inch for vertical displacements of the laser lens assembly 204 of up to five inches.

Thus, there has been shown a new and improved apparatus and method for achieving alignment of a laser beam with respect to the axis along which a laser beam focusing lens is moved to focus the laser beam at different elevational positions to achieve different laser machining steps. To this end, the mechanism, including at least one steering mirror, is adjustably mounted, whereby fine adjustments of the elevational and azimuth position of the mirror may be made to achieve the desired alignment. At least two alignment targets are disposed in the path of the laser beam and cast shadows on a display member, the shadows producing an image on the display member that may be externally observed by a television camera. The precise alignment of the laser beam and the lens movement axis produces a desired pattern, whereby the operator knows that alignment has been achieved.

In considering this invention, it should be remembered that the present disclosure is illustrative only and the scope of the invention should be determined by the appended claims.

We claim:

1. Apparatus for performing a plurality of laser machining operations, said laser machining apparatus comprising:

(a) means for emitting a laser beam along a path;
(b) means disposed within said path and movable along an axis for variably focusing the laser beam at a plurality of different focal spots corresponding to said plurality of laser machining operations;
(c) means for aligning at least a portion of said path with said axis, whereby the lateral displacement of each of said plurality of focal spots from said axis is reduced as said focusing means is moved along said axis;
(d) an alignment target; and
(e) means for removably mounting said alignment target within said path, whereby said alignment target intercepts the laser beam and casts a shadow whose pattern is indicative of whether or not said path is aligned with said axis.

2. Laser machining apparatus as claimed in claim 1, wherein said aligning means is adjustable and there is further included display means disposed to receive said alignment target shadow, whereby said aligning means may be adjusted such that said path is aligned with said axis.

3. Laser machining apparatus as claimed in claim 2, wherein there is included a second alignment target, said mounting means disposing said first mentioned and said second alignment targets in a spaced relationship with each other and to intercept said laser beam to cast a composite shadow of said first mentioned and second alignment targets onto said display means.

4. Laser machining apparatus as claimed in claim 3, wherein each of said first mentioned and said second alignment targets includes corresponding first and second shadow casting members, said positioning means positioning said first and second shadow casting members in predetermined relationships with respect to said axis, whereby said first and second shadow casting members cast a composite shadow onto said display means when said path is aligned with said axis.

5. Laser machining apparatus as claimed in claim 5, wherein each of said first mentioned and said second alignment targets comprises an annular ring and first and second shadow casting members, each shadow casting member being of an arcuate configuration and being disposed oppositely of the other of said first and second arcuate shadow casting members, said positioning means disposing said first and second alignment targets such that said first and second shadow casting members of each of said first mentioned and second alignment targets is disposed equally spaced from said axis, whereby said composite shadow of said first mentioned and second alignment targets approximates a circle.

6. Laser machining apparatus as claimed in claim 2, wherein said aligning means comprises a mirror adapted to rotate about a first axis and means for variably adjusting the position of said mirror with respect to said axis to control the angles of incidence and exit of, said laser beam onto and from said mirror.

7. Laser machining apparatus as claimed in claim 6, wherein said mirror is adjusted about a second axis disposed substantially perpendicular with respect to said first axis and there is further included second means for continuously adjusting the rotational position of said mirror about said second axis.

8. Apparatus for performing a plurality of laser machining operations, said laser machining apparatus comprising:

(a) means for emitting a single laser beam;

(b) beam directing means disposed to intercept the laser beam and operative in a first mode for directing the laser beam along a first laser path and in a second mode for directing the laser beam along a second laser path distinct from said first laser path;

(c) first and second means disposed respectively within said first and second paths and movable along first and second axes for variably focusing the laser beam at a plurality of different focal spots corresponding to said plurality of laser machining operations; and (d) first and second means for aligning at least a portion of said first and second paths respectively with said first and second axes, whereby the lateral displacements of said plurality of focal spots from said corresponding axes are reduced as each of first and second focusing means is moved along its corresponding axis.

9. Laser machining apparatus as claimed in claim 8, wherein said first and second aligning means are disposed respectively to intercept said first and second paths and for redirecting said first and second laser beams respectively along third and fourth paths.

10. Laser machining apparatus as claimed in claim 9, wherein said first and second focusing means are respectively disposed to intercept said third and fourth paths.

11. Laser machining apparatus as claimed in claim 10, wherein each of said first and second aligning means comprises a steering mirror disposed to receive the laser beam as directed along said first and second paths and for reflecting said laser beams along said third and fourth paths respectively.

12. Laser machining apparatus as claimed in claim 10, wherein said first aligning means comprises first and second steering mirrors, said first steering mirror disposed to intercept the laser beam as directed along said first path, said second mirror disposed to receive the laser beam as reflected from said first steering mirror and for redirecting said laser beam along said third path, said second aligning means comprises third and fourth steering mirrors, said third steering mirror disposed to intercept the laser beam as directed along said second path, said fourth steering mirror disposed to receive the laser beam as reflected from said third steering mirror and for redirecting said laser beam along said fourth path.

13. Laser machining apparatus as claimed in claim 12, wherein each of said first, second, third, and fourth steering mirrors is rotatably mounted about a first axis and there is included means for continuously varying the position of said steering mirror about its axis.

14. Laser machining apparatus as claimed in claim 13, wherein each of said first, second, third and fourth steering mirrors is adjustable about a second axis disposed substantially perpendicular with respect to said first axis and there is further included second means for continuously adjusting the rotational position of said corresponding steering mirror about said second axis.

15. Laser machining apparatus as claimed in claim 10, wherein there is included an alignment target, first and second means for removably mounting said alignment target within either of said third and fourth paths, whereby said alignment target intercepts the laser beam and casts a shadow whose pattern is indicative of whether or not said third and fourth paths are aligned with said first and second axes, respectively.

16. Laser machining apparatus as claimed in claim 15, wherein each of said first and second aligning means is adjustable and there is further included display means disposed to receive said alignment target shadow, whereby said first and said aligning means may be adjusted such that each of said third and fourth paths is aligned with said first and second axis, respectively.

17. Apparatus for performing a plurality of laser machining operations, said laser machining apparatus comprising:

(a) means for emitting a single laser beam;

(b) beam directing means disposed to intercept the laser beam and operative in a first mode for directing the laser beam along a first laser path and in a second mode for directing the laser beam along a second laser path distinct from said first laser path;

(c) first and second means movable along first and second axes for variably focusing the laser beam at a plurality of different focal spots corresponding to said plurality of laser machining operations;

(d) first and second means for aligning at least a portion of said first and second paths respectively with said first and second axes, whereby the lateral displacements of said plurality of focal spots from said corresponding axis are reduced as each of first and second focusing means is moved along its corresponding axis, said first and second aligning means are disposed respectively to intercept said first and second paths and for redirecting the laser beam respectively along third and fourth paths, said first aligning means comprises first and second steering mirrors, said first steering mirror being disposed to intercept the laser beam as directed along said first path, said second mirror disposed to receive the laser beam as reflected from said first steering mirror and for redirecting the laser beam along said third path, said second aligning means comprises third and fourth steering mirrors, said third steering mirror being disposed to intercept the laser beam as directed along said second path, said fourth steering mirror disposed to receive the laser beam as reflected from said third steering mirror and for redirecting the laser beam along said fourth path;

(e) said first and second focusing means are respectively disposed to intercept said third and fourth paths;

(f) an alignment target;

(g) first and second means for removably mounting said alignment target within a corresponding one of said third and fourth paths, whereby said alignment target intercepts said laser beam and casts a shadow whose pattern is indicative of whether or not said third and fourth paths are aligned with said first and second axes, respectively;

(h) display means disposed to receive said alignment target shadow; and (i) said first and second aligning means are adjustable such that said third and fourth paths are aligned with first and second axis.

* * * * *